United States Patent
Liu et al.

(10) Patent No.: US 7,194,649 B2
(45) Date of Patent: Mar. 20, 2007

(54) CLOCK SYNCHRONIZATION FOR NETWORK MEASUREMENTS WITH CLOCK RESETS

(75) Inventors: Zhen Liu, Tarrytown, NY (US); Cathy Honghui Xia, White Plains, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 10/157,610

(22) Filed: May 29, 2002

(65) Prior Publication Data

US 2002/0188881 A1 Dec. 12, 2002

Related U.S. Application Data

(63) Continuation-in-part of application No. 09/920,138, filed on Jul. 31, 2001, now Pat. No. 6,957,357.

(60) Provisional application No. 60/244,228, filed on Oct. 30, 2000.

(51) Int. Cl.
*G06F 1/12* (2006.01)

(52) U.S. Cl. .................. 713/400; 713/375; 713/503

(58) Field of Classification Search ............. 713/400, 713/375, 503
See application file for complete search history.

(56) References Cited

U.S. PATENT DOCUMENTS 6,661,810 B1 * 12/2003 Skelly et al. ............... 370/516

OTHER PUBLICATIONS

Moon et al., "Estimation and Removal of Clock Skew from Network Delay Measurements", Department of Computer Science, University of Massachusetts, 9pp.
Paxson, "On Calibrating Measurements of Packet Transit Times", Network Research Group, University of California, Berkeley, pp. 1-13.
Liu et al. Clock Synchronization for Network Measurements, Jul. 31, 2001.

* cited by examiner

*Primary Examiner*—Rehana Perveen
*Assistant Examiner*—Tse Chen
(74) *Attorney, Agent, or Firm*—Duke W. Yee; Mark Wardas; Gerald H. Glanzman (57) ABSTRACT

Several algorithms are provided to estimate and remove relative clock skews from delay measurements based on the computation of convex hulls. The algorithms are linear in the number of measurement points for the case with no clock resets. For the more challenging case with clock resets, i.e., the clocks are reset to some reference times during the measurement period, linear algorithms are provided to identify the clock resets and derive the best clock skew lines. The algorithms are also extended to environments in which at least one of the clocks is controlled by Network Time Protocol. These algorithms can also be extended for active clock synchronization to replace or further improve Network Time Protocol.

9 Claims, 6 Drawing Sheets

CLOCK SYNCHRONIZATION FOR NETWORK MEASUREMENTS WITH CLOCK RESETS

RELATED APPLICATIONS

The present application is a continuation-in-part of application Ser. No. 09/920,138, entitled "CLOCK SYNCHRONIZATION FOR NETWORK MEASUREMENTS," filed Jul. 31, 2001 now U.S. Pat. No. 6,957,357, which claims priority from U.S. Provisional Patent Application No. 60/244,228, filed Oct. 30, 2000, both herein incorporated by reference.

BACKGROUND OF THE INVENTION

1. Technical Field

The present invention relates to network delay measurements and, in particular, to correcting errors in end-to-end network delay measurements between two communicating data processing systems. Still more particularly, the present invention provides a method, apparatus, and program for correcting errors in network delay measurements due to clock skew and clock resets.

2. Description of Related Art

Packet delay traces are important measurements for analyzing end-to-end performance and for designing traffic control algorithms in computer networks. These measurement data can help in decision making in traffic routing, capacity planning, application tuning, alarm detection and network fault detection, etc. These delay traces can be obtained either by monitoring tools or by active probing. In either case, time stamps of packets are collected at the source and the destination. The difference between the two time stamps of the same packet is the measured delay for the end-to-end network delay experienced by that packet. If the two host clocks are perfectly synchronized, then the measured delay is the true delay. However, in real measurements, the two host clocks are usually not synchronized. In particular, the two clocks may run at different speeds. This difference in speed is called the "clock skew." It is therefore possible for the receiver to receive a packet from the "future," resulting in a negative delay according to the measurement. The measured delay in this case would be very different from the true delay.

The problem of estimating and removing the relative clock skews from delay measurements becomes more challenging and complicated if the clocks are reset through system calls such as "rdate." Such resets are typically performed at a very coarse level, for example, a couple of times a day. Without prior knowledge of the reset times, one must "detect" them from the data, and obtain the "correct" delay measurements. Another type of resets is velocity adjustments through the use of Network Time Protocol (NTP). Such velocity adjustments are usually performed at a finer time granularity.

Therefore, it would be advantageous to provide an improved method, apparatus, and program for clock synchronization for network measurements with clock resets.

SUMMARY OF THE INVENTION

The present invention provides several algorithms to estimate and remove relative clock skews from delay measurements based on the computation of convex hulls. Compared with existing techniques such as linear regression and linear programming, the convex-hull approach provides better insight and allows more error metrics. The algorithms are linear in the number of measurement points for the case with no clock resets. For the more challenging case with clock resets, i.e., the clocks are reset to some reference times during the measurement period, the present invention provides linear algorithms to identify the clock resets and derive the best clock skew lines. The algorithms are also extended to environments in which at least one of the clocks is controlled by Network Time Protocol. These algorithms can greatly improve the accuracy of the measurements and can be used both online and offline. They can also be extended for active clock synchronization to replace or further improve Network Time Protocol.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
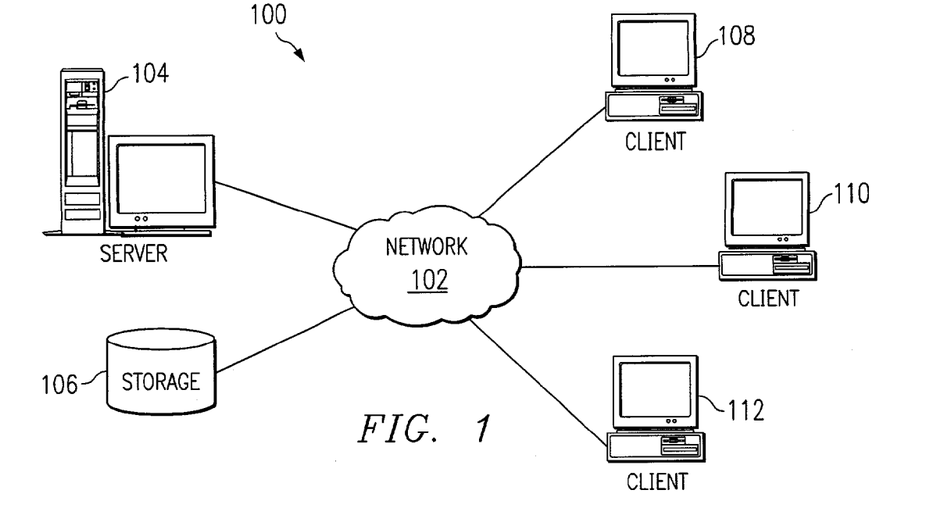
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
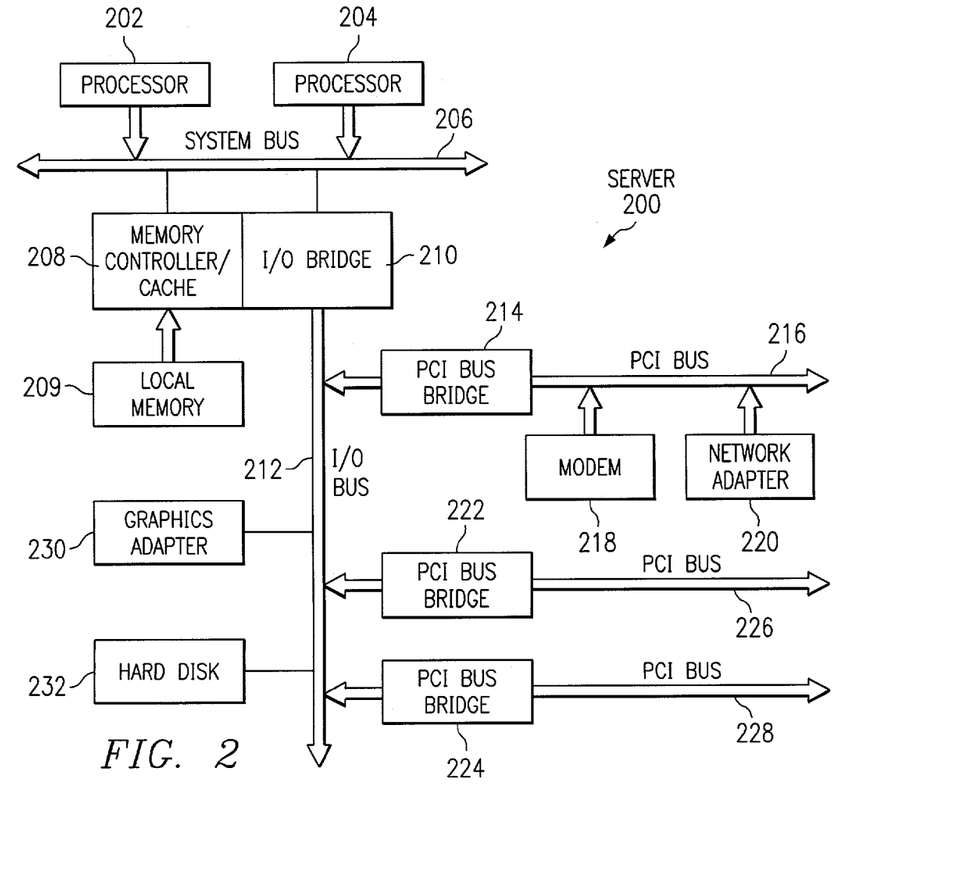
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
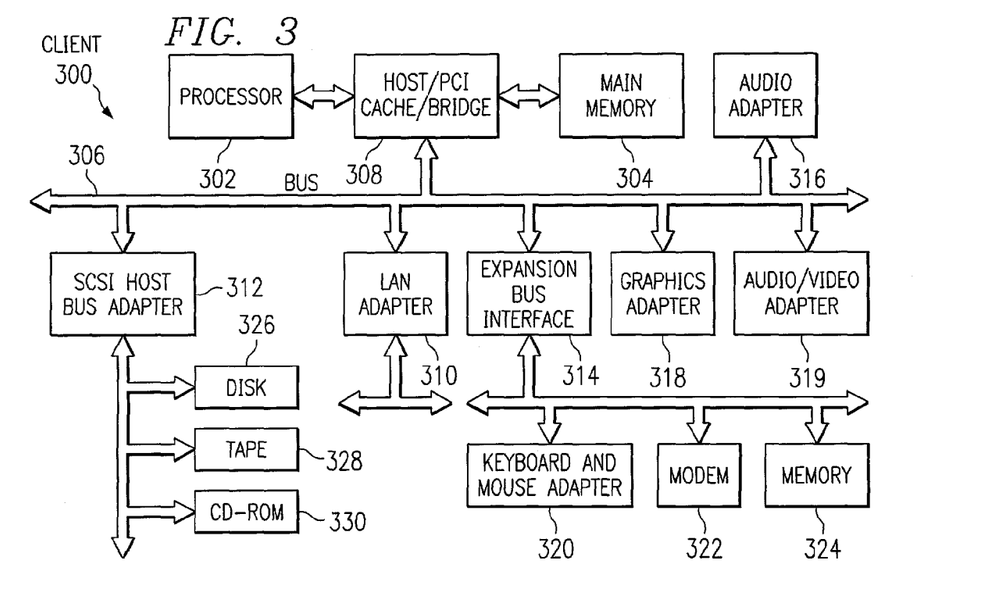
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and program product for estimating the clock skew in end-to-end network measurements based on empirical measurements of actual delay. Although one may have no prior knowledge about the offset, about skew between the two clocks, and about the reset times of either clock, there is still a lot of information contained in the data that allows reasonable estimates of the clock skew. Assuming a collection of measurement data, $\Omega:=\{V_i=(t_i, d_i): i=1, \ldots, N\}$, where $t_i$ is the time the packet was sent according to sender's clock, and $d_i$ is the measured delay. The delay is measured by sending a packet from a first computer to a second computer. This is referred to as "one-way-delay." The delay may also be measured by sending a packet from a first computer to a second computer and receiving the packet back again at the first computer. This is referred to as "two-way-delay." The first computer and second computer may be any combination of clients and/or servers, as shown in FIG. 1.

Figure 4A:
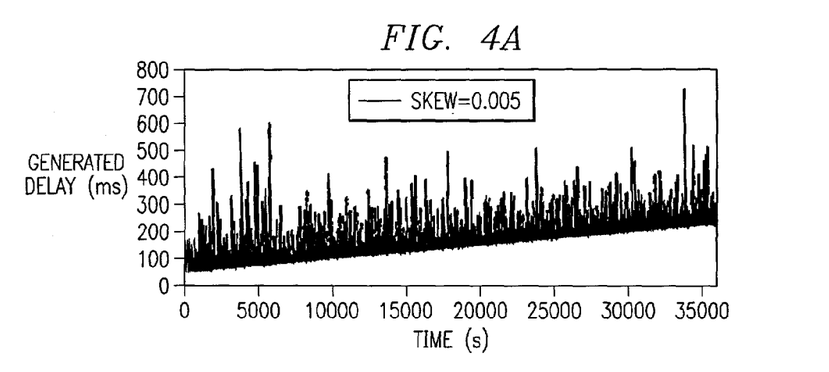
FIGS. 4A and 4B are exemplary plots of measured end-to-end delays over time in accordance with a preferred embodiment of the present invention.
Figure 4B:
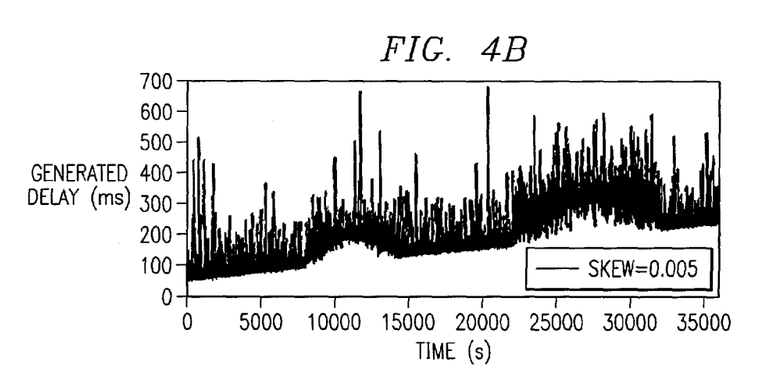

FIG. 4A is a plot of these data in a two-dimensional plane using $t_i$ as the x coordinate and $d_i$ as they coordinate. As seen in FIG. 4A, all the points are supported by a straight line and this straight line has a non-zero slope. The interpretation of this phenomenon would be that there is a steady trend for the delay to grow (or decay) as time progresses, which is very unlikely to happen if the two clocks are perfectly synchronized. It is therefore reasonable to attribute such a trend to clock skew. After removing such clock skew, the resulting delay can then be used as a true measurement of the network condition. It is also possible for temporary Internet congestion to cause the delay measurements to increase for a period of time. This is illustrated by the plot in FIG. 4B with simulated data.

In accordance with a preferred embodiment of the present invention, clock skew is estimated based on the computation of convex hulls. Compared with existing techniques, such as linear regression and linear programming, the convex hull approach provides better insight and allows more error metrics. The algorithms used are linear in the number of measurement points when there are no clock resets. For the more challenging cases with clock resets, i.e., the cases where the clocks are reset to some reference times when the delay traces are recorded, linear algorithms are used to identify the clock resets, and then derive the best clock skew lines.

This analysis may be extended to environments in which at least one of the clocks is controlled by NTP. These algorithms can greatly improve the accuracy of the measurements, and they can be used both online and offline. The online feature of the present invention allows the algorithms to be used for online clock synchronization. Furthermore, the present invention has the advantage that it provides analytical solutions for different objective functions.

General Problem

Based on the observations made above, namely, the supporting straight line for clock skew and the abrupt shift of the delay level for clock reset, a mathematical formulation for the clock skew problem can be obtained.

Assuming a collection of measurements, $\Omega:=\{V_i=(t_i, d_i): i=1, \ldots, N\}$, if clock resets are not considered, the problem is to find a linear function which is below all the points in, and is closest to $\Omega$ in some sense. There are many possible metrics for determining how close a line is to a set of points. With clock resets, the problem is then to find a piecewise linear function, with each piece having the same slope, such that all the points in $\Omega$ are above the function, and such that this piecewise linear function is closest to $\Omega$ under some objective function. Note that each piece should have the same slope since the difference in speed (or the rate of the skewness) of two given clocks is fixed. In real systems, one would not expect frequent clock resets. One may assume that all the $t_i$'s are initially sorted in increasing order, which will usually be the case. This assumption allows linear time algorithms to be developed to solve the problem.

Convex Hull Approach for Clock Skew Estimation

Focusing on the simpler case with no clock reset, suppose the line for clock skew is $L:=\{(t, d)|d=\alpha t+\beta\}$. The restriction for all the points in $\Omega$ to be above this line can be expressed as an affine function as follows:

$$\alpha t_i+\beta \leq d_i.$$

Among all lines that satisfy this condition the one that is the closest to $\Omega$ is chosen.

The present invention considers three metrics that can be used as the objective function for the optimization problem described above. One possible objective function, $obj_1$, is the sum of the vertical distances between the data points and the affine function line. A second similar objective function, $obj_2$, is the area between the "curve" formed by the data points and the affine function (via the trapezoidal rule). An optimal affine function will minimize this objective function. A third objective function, $obj_3$, the number of points on the affine function line. An optimal affine function will maximize one of the three above objective functions. These objective functions are used as example metrics to illustrate how the approach in the preferred embodiment works. A person of ordinary skill in the art will recognize that other object functions may be used to solve the problem.

(1) Minimize the sum of the vertical distances between the points and the line.

This objective function is defined as follows:

$$obj_1 := \sum_{i=1}^{N}(d_i - \alpha t_i - \beta) = \sum_{i=1}^{N} d_i - \sum_{i=1}^{N} t_i \alpha - N\beta.$$

(2) Minimize the area between the curve and the line.

To obtain this objective function, one can sum over the area between the line $y=\alpha t+\beta$ and the line segment between every two consecutive points in $\Omega$. This results in the following:

$$obj_2 := \sum_{i=1}^{N-1}(d_i - \alpha t_i - \beta + d_{i+1} - \alpha t_{i+1} - \beta)\frac{(t_{i+1}-t_i)}{2}$$

$$= \sum_{i=1}^{N-1}\frac{(d_i+d_{i+1})(t_{i+1}-t_i)}{2} - \frac{t_N^2-t_1^2}{2}\alpha - (t_N-t_1)\beta$$

In the special case that the sender is sending out packets regularly, the two objective functions, $obj_1$ and $obj_2$, are equivalent, since $N$, $d_i, \ldots, d_N$, and $c$ are fixed constants with given data.

(3) Maximize the Number of Points on the Line.

This objective function is different from the previous two in the sense that it is not linear in the variables $\alpha$ and $\beta$. The objective function can be written using the following indicator function:

$$obj_3 := \sum_{i+1}^{N} 1_{\{d_i = at_i + \beta\}}.$$

These three objective functions characterize different aspects of the observation of making the skew line as close to the points as possible. Each of the objective functions works well under certain circumstances and performs poorly for some other cases. Intuitively, they give different weights for individual points in evaluating the distance between a set of points and a line.

The significance of the convex hull is that the "closest" line L to Ω will touch Ω at some point. If L does not touch Ω, one can always shift the line up so that it is "closer" to Ω. Therefore, no matter what objective function one uses, the optimal straight line L will be below the convex hull, co(Ω) and touch it at some point. Furthermore, it is easy to show that at least one of the touching points is in Ω. This is because all the vertices of co(Ω) are points in Ω, and the "closest" line to Ω touches co(Ω) at one or more of its vertices.

An algorithm, Convex_Hull_L, finds co(Ω), which is used to find the optimal straight line with respect to the three objective functions. Given $\Omega = \{V_i = (t_i, d_i): i=1, \ldots, N\}$, with $t_1 \leq t_2 \leq \ldots \leq t_N$, the lower boundary of co(Ω) is found. It is known that this lower boundary is composed of line segments whose end points are in Ω. The algorithm uses a stack to keep track of these points.

The algorithm examines the points in Ω from left to right. For each point, the algorithm determines whether to push the point into the stack right away or to pop some points out of the stack and push this point in. At the end of the algorithm, all the points in the stack are the vertices of the lower boundary of co(Ω). For convenience, line(v, w) is used to denote the straight line connecting the two points v and w.

Algorithm Convex_Hull_L:
(1) Initialize: push $v_1$; push $v_2$;
(2) For i=3 to N
    If ($v_i$ above line(top, next_to_top)) push $v_i$;
    Else
        While ($v_i$ below line(top, next_to_top) and stack_size>1) pop;
        push $v_i$;
(3) End It is easy to see that when the algorithm stops, all the points in the stack are in Ω and the line segments of the consecutive points in the stack are in co(Ω). Furthermore, all the points in Ω are above these line segments. This is because each point $v_i$ is pushed into the stack when it is first seen. It is popped out of the stack only when it is above the line segment between two other points in Ω. Therefore, the line segments of all the consecutive points in the stack are lower than the boundary of co(Ω).

In the algorithm, for every comparison either a new point gets pushed into the stack, or a point in the stack gets popped out. Each point in Ω is pushed into the stack exactly once, and popped out at most once. Therefore, there are at most 2N push and pop operations before the algorithm stops.

Still further, straightforward modifications of algorithm Convex_Hull_L by reversing the role of "above" and "below" provides an algorithm that may be named Convex_Hull_U, which gives the upper boundary of the convex hull. Combining Convex_Hull_L and Convex_Hull_U, one may find the convex hull of Ω in linear time.

The convex hull approach is described in more detail in U.S. patent application Ser. No. 09/920,138, entitled "CLOCK SYNCHRONIZATION FOR NETWORK MEASUREMENTS," herein incorporated by reference.

Clock Skew Corrections with Clock Resets

In accordance with a preferred embodiment of the present invention, clock resets may include those clock resets that perform instantaneous time adjustments and the type of smooth velocity adjustments used in NTP.

As mentioned previously, in real measurements, one may not expect to have many such instantaneous clock resets. Therefore, assuming a fixed number of resets and no change in clock speeds before and after the clock resets, the skew lines before and after the clock resets should have the same slope. The three objective functions may be used to measure the "goodness" of a skew slope.

Figure 5A:
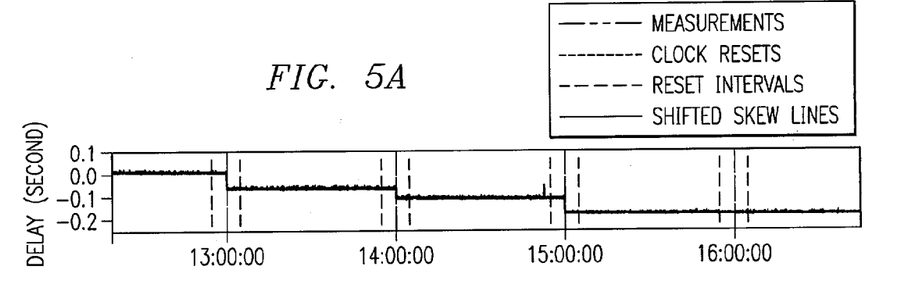
FIGS. 5A–5C illustrate example measurement samples for two closely located machines connected by a network with instantaneous clock adjustments in accordance with a preferred embodiment of the present invention.
Figure 5B:
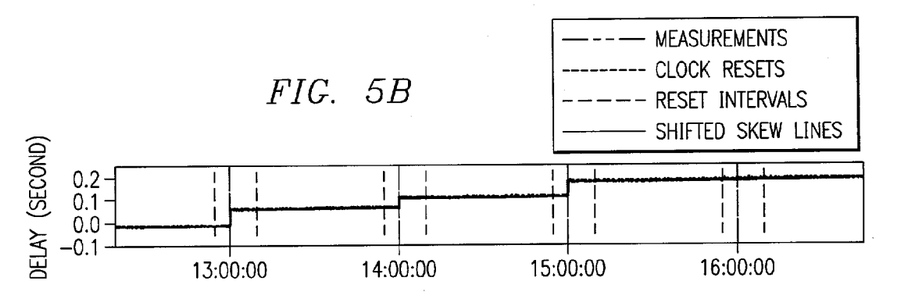
Figure 5C:
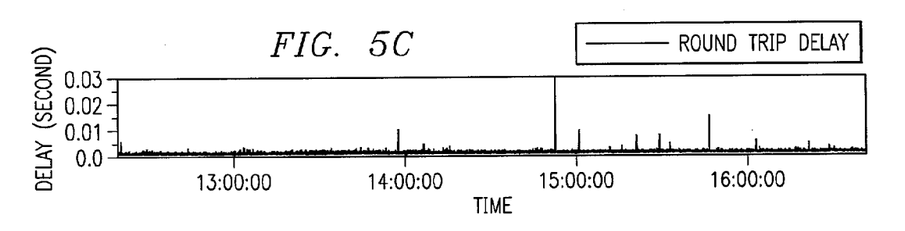

FIGS. 5A–5C illustrate example measurement samples for two closely located machines connected by a network with instantaneous clock adjustments in accordance with a preferred embodiment of the present invention. FIGS. 5A and 5B show the two one-way delay measurements. FIG. 5C shows the round trip delay between the two machines. In the event of a clock reset, one would observe a supporting straight line for a duration of time and then an abrupt shift of the delay level, followed by another supporting straight line of the same slope. This abrupt shift of the delay level is likely due to the clock reset, though it could be for other reasons, such as the failure of a router, resulting in different routing of the packets.

One Clock Reset

Supposing there is only one clock reset during the entire trace and that the clock reset time is $t_{k+1}$, one may vary k to obtain the best $t_{k+1}$ as the final solution for the clock reset time. Suppose the supporting clock skew lines in the two sections (i.e., the sections before and after time $t_{k+1}$) are $L_1 := \{(t, d) | d = \alpha t + \beta_1, t \leq t_k\}$, and $L_2 := \{(t, d) | d = \alpha t + \beta_2, t \geq t_{k+1}\}$. Let $\Omega_1 := \{v_i = (t_i, d_i): i=1, \ldots, k\}$, $\Omega_2 := \{v_i = (t_i, d_i): i=k+1, \ldots, N\}$. It is required that all points in $\Omega_1$ and $\Omega_2$ are above lines $L_1$ and $L_2$, respectively. This restriction can be expressed as:

$$\alpha t_i + \beta_1 \leq d_i, \, i \leq k;$$

$$\alpha t_i + \beta_1 \leq d_i, \, i > k;$$

Among all the lines that satisfy this condition, the lines that are closest to $\Omega_1$ and $\Omega_2$ are chosen. The three objective functions for measuring the closeness of the skew line to the set Ω are described below.

(1) Minimize the sum of the vertical distances between the points and the line.

$$obj_1 := \sum_{i=1}^{N} d_i - \sum_{i=1}^{N} t_i a - k\beta_1 - (N-k)\beta_2$$

(2) Minimize the area between the curve and the line.

Summing over the area between the line $d = \alpha t + \beta$ and the line segment between every two consecutive points in Ω gives:

$$obj_2 := \sum_{i=1}^{k-1} \frac{(d_i + d_{i+1})(t_{i+1} - t_i)}{2} + \sum_{i=k+1}^{N-1} \frac{(d_i + d_{i+1})(t_{i+1} - t_i)}{2} - \frac{t_N^2 - t_{k+1}^2 + t_k^2 - t_1^2}{2} a - (t_k - t_1)\beta_1 - (t_N - t_{k+1})\beta_2.$$

Unlike the case with no clock resets, even when the measurement points are equally spaced, i.e., $t_{i+1} - t_i = c$, $obj_1$, and $obj_2$ are no longer related by a linear equation. The optimal solutions for the two objective functions, therefore, are not always the same. However, $obj_1$ and $obj_2$ are still linear functions of $\alpha$, $\beta_1$, $\beta_2$ which is the key property for the analysis and the development of the following algorithms.

(3) Maximize the number of points on the line.

Counting the number of points over the two sections, the third objective function becomes:

$$obj_3 := \sum_{i=1}^{k} 1_{\{d_i = \alpha t_i + \beta_1\}} + \sum_{i=k+1}^{N} 1_{\{d_i = \alpha t_i + \beta_2\}}.$$

One may next use linear time algorithms for the three objective functions by computing the convex hull of the two sections of $\Omega$. The best solution consists of two parallel line segments with each segment supporting under the corresponding section of $\Omega_1$ and $\Omega_2$, and touching the sections at point $t_{i_1}$ and $t_{i_2}$. Geometrically, for fixed slope $\alpha$, we are simply shifting the line segment to touch the lower convex hull of $\Omega_1$ and $\Omega_2$ at vertices $t_{i_1}$ and $t_{i_2}$. As the slope a increases, the touching vertices $t_{i_1}$ and $t_{i_2}$ will move from left to right along the lower convex hull of $\Omega_1$ and $\Omega_2$. It can be shown that the objective functions $obj_1$ and $obj_2$ are convex in a. As a increases from negative infinity, $obj_1$ and $obj_2$ will first decrease and then increase. The optimal solution is reached at the point that the objective functions change from decreasing to increasing. The conditions for the optimal solutions are given as follows:

The first optimality condition for $obj_1$ is:

$$kt_{i_1} + (N-k)t_{i_2} = \sum_i t_i.$$

And the second optimality condition for $obj_2$ is:

$$(t_k - t_1)t_{i_1} + (t_N - t_{k+1})t_{i_2} = (t_N^2 - t_{k+1}^2 + t_k^2 - t_1^2)/2.$$

For the fixed clock reset time $t_{k+1}$, the optimal solution for the distance objective, $obj_1$, is the section of the lower boundaries of $co(\Omega_1)$ and $co(\Omega_2)$ that satisfies the first condition. The optimal solution for the area objective, $obj_2$, is the section of the lower boundaries of $co(\Omega_1)$ and $co(\Omega_2)$ that satisfies the second condition.

Multiple Clock Resets

The results for the single clock reset can be easily extended to the case with multiple clock resets. Assuming first that R clock reset times are given, the reset times $\{t_{k_1+1}, t_{k_2+1}, \ldots, t_{k_R+1}\}$, $(1 < k_1 < k_2 < \ldots < k_R < N-1)$ divide all the points into R+1 sections:

$$\Omega_1 := \{v_i = (t_i, d_i) : i = 1, \ldots, k_1\},$$
$$\vdots$$
$$\Omega_{R+1} := \{v_i = (t_i, d_i) : i = k_R + 1, \ldots, N\}.$$

The present invention finds the best skew lines in the R+1 segments such that they have the same slope and are close to $\Omega_j, j=1, \ldots, R+1$.

First, the convex hull of each section, $\Omega_j, j=1, \ldots, R+1$, is obtained. The optimal skew line must touch at least one point in each section. One may assume that $t_{i_1}, \ldots, t_{i_{R+1}}$ are the extreme points that the optimal skew lines touch in each section.

For the distance objective, $obj_1$, the first optimality condition generalizes to the following:

$$k_1 t_{i_1} + (k_2 - k_1)t_{i_2} + \ldots + (N - k_R)t_{i_{R+1}} = \sum_i t_i.$$

For the area objective, $obj_2$, the second optimality condition generalizes to the following:

$$(t_{k_1} - t_1)t_{i_1} + (t_{k_2} - t_{k_1+1})t_{i_2} + \ldots + (t_N - t_{k_R+1})t_{i_{R+1}} = V/2,$$

where $V = t_{k_1}^2 - t_1^2 + t_{k_1+1}^2 + \ldots t_{Nk_R+1}^2$. Further note that the time of the touching vertices $t_{i_1}, \ldots, t_{i_{R+1}}$ increases as a increases. For the fixed clock resets at times $\{t_{k_1+1}, \ldots, t_{k_R+1}\}$, $(1 < k_1 < \ldots < k_R < N-1)$, the optimal solution for the distance objective $obj_1$, is the section of the lower boundary of $co(\Omega)$ that satisfies the first condition above. The optimal solution for the area objective, $obj_2$, is the section of the lower boundary of $co(\Omega)$ that satisfies the second condition above.

Based on these results, the following algorithm is provided to identify the optimal clock skew slope a for a given set of clock reset times, $\{t_{k_1+1}, t_{k_2+1}, \ldots, t_{k_R+1}\}$. To simplify the notation, values are set as follows: $k_0 = 0$, $k_{R+1} = N+1$. The algorithm Convex_Hull_L is applied for each section $\Omega_j, j=1, \ldots, R+1$, to obtain the lower convex hulls. Let $convex^j = (k_j + 1, \ldots, k_{j+1})$ be the indices of the vertices of the lower convex hull of $\Omega_j$.

Algorithm Identify_Best_Alpha:
(1) Initialize:
  index[i]=$k_i$+1, i=0, ..., R;
  slope[i]=slope($v_{index[i]}$, $v_{index[i]+1}$), i=0, ..., R;
  Set LHS and RHS;
(2) While (LHS<RHS)
  segment=arg min{slope[0], ..., slope[R]};
  index[segment]=next_index_in convex$^{segment}$;
  $\alpha$=slope[segment];
  Update slope[segment];
  Update LHS;
(3) Output slope a and indices index[0], ..., index[R];
End.

For objective functions $obj_1$ or $obj_2$, LHS and RHS denote the left hand side and right hand side of the first optimality condition or second optimality condition, respectively.

With the assumption that there is at most one clock reset every p units of time (p=N/(R+1)), one can search through every possible clock reset combination and apply algorithm Identify_Best_Alpha for each of the combinations. The clock skew slope is then the best solution among all the possible clock reset combinations. The overall algorithm can be summarized as follows:

Algorithm R-Resets:
(1) Loop through $$k_i = \frac{(i-1)N}{p} + 1, \ldots, \frac{iN}{p}, i = 1, \ldots, R;$$

Define $\Omega_1, \ldots, \Omega_{R+1}$;
Apply Convex_Hull_L, obtain $co(\Omega_i)$, i=1, ..., R;

Apply Identify_Best_Alpha, obtain best α for given $k_1, \ldots, k_R$;
Record current best solution and minimum objective value;
End loop;
(2) Output best slope α and clock reset times;
End.

If there are R clock resets, then there are R loops each with N/R possibilities.

The major component in the complexity of the general R-Resets algorithm lies in the combinatorial search for all possible clock reset points. To further reduce the complexity, a heuristic algorithm may be used to identify the number of clock resets and where they occur.

Figure 6:
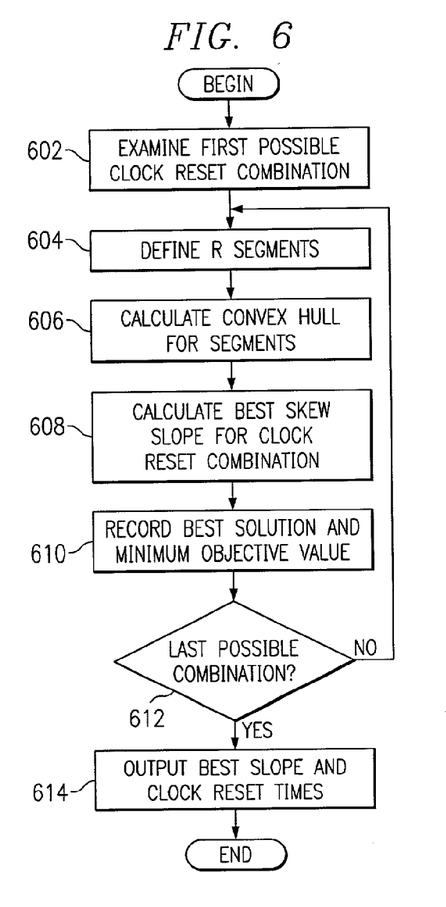
FIG. 6 is a flowchart illustrating the operation of a process for determining the skew line and reset times for a known number of resets in accordance with a preferred embodiment of the present invention.

With reference to FIG. 6, a flowchart is shown illustrating the operation of a process for determining the skew line and reset times for a known number of resets in accordance with a preferred embodiment of the present invention. The process begins and examines a first possible clock reset combination (step 602). Next, the process defines a number, R, of segments (step 604), calculates a convex hull for each segment (step 606), calculates the best skew slope for the clock reset combination (step 608), and records the best solution and minimum objective value (step 610). The convex hull and best skew slope may be calculated, for example, using the algorithms Convex_Hull_L and Identify_Best_Alpha, respectively.

Then, a determination is made as to whether the current clock reset combination is the last possible clock reset combination (step 612). If it is not the last possible combination, the process returns to step 604 to define a number, R, of segments for the next combination. If, however, the current clock reset combination is the last possible combination in step 612, the process outputs the best slope and clock reset times (step 614) and ends.

In an alternative embodiment, a divide-and-conquer approach may be used to identify the occurrences of clock resets. First, the whole data set is divided into intervals. These intervals should be wide enough so that the structural property of the delay measurements can be observed within each interval. In particular, one should observe a supporting straight line underneath the delay points in each interval. On the other hand, these intervals need to be narrow enough so that there is at most one clock reset within any three consecutive intervals. One may then apply Convex_Hull_L and the objective functions to identify the best skew lines within each interval.

The skew lines are compared for two adjacent intervals by calculating the maximum distance between the two skew lines inside the two intervals. The two skew lines are considered to be the same if the maximum distance is smaller than some given tolerance level. For each interval, if the skew line is different from any of its two neighboring intervals then this interval is marked with the possibility of containing a clock reset. Because a clock reset can result in two consecutive marked intervals, the adjacent marked intervals may be merged so that one can infer there is exactly one clock reset within each marked interval. The linear search algorithm for one clock reset is then applied to identify the clock reset within each marked interval. One may also use the skew slopes in the (unmarked) intervals without clock resets to identify the best clock reset within the marked intervals. These two approaches have the same complexity and provide the same results in practice. The collection of all the resets within marked intervals are all the reset points.

Algorithm Divide_And_Conquer:
(1) Divide all the data into intervals of width w;
(2) For each interval, apply Convex_Hull_L and the objective functions to identify best skew lines;
(3) For each interval,
compare its skew line with neighbor skew lines;
set marks for possible clock resets;
(4) Merge marked intervals to form intervals with exactly one clock reset;
(5) For each marked interval, identify the best clock reset by the linear search algorithm for one clock reset;
or linear search for one clock reset with slope given by some average of the slopes in the unmarked intervals;
(6) Merge the clock resets in all the marked intervals;
(7) Calculate the best skew lines for the identified clock resets.

This algorithm has the advantage that it identifies the number of clock resets, instead of being supplied with the number of clock resets ahead of time. The algorithm agrees with the intuition from visual observations for reset points.

Furthermore, the Divide_And_Conquer algorithm is very efficient and provides the correct answer under two assumptions. First, it assumes that clock resets do not happen very often and that one can identify the minimal distance between two clock resets. Secondly, one needs to specify a tolerance level for the comparison of two skew lines. This tolerance level may be interpreted as the accuracy of the clocks. These assumptions are fairly minimal, and hold true for most real system clocks.

Figure 7:
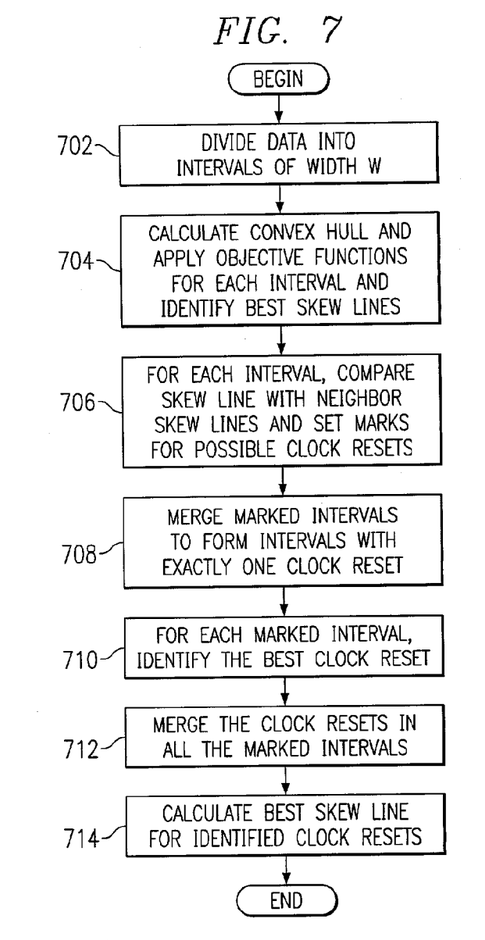
FIG. 7 is a flowchart illustrating the operation of a process for identifying the occurrences of clock resets using a divide-and-conquer approach in accordance with a preferred embodiment of the present invention.

With reference now to FIG. 7, a flowchart illustrating the operation of a process for identifying the occurrences of clock resets using a divide-and-conquer approach is shown in accordance with a preferred embodiment of the present invention. The process begins and divides the data into intervals of width w (step 702). Next, the process calculates the convex hull and applies the objective functions for each interval and identifies the best skew lines (step 704). The convex hull and best skew lines may be calculated, for example, using algorithms described in more detail in U.S. patent application Ser. No. 09/920,138, entitled "CLOCK SYNCHRONIZATION FOR NETWORK MEASUREMENTS," herein incorporated by reference. For each interval, the process compares the skew line with the neighbor skew lines and sets marks for possible clock resets (step 706).

Thereafter, the process merges marked intervals to form intervals with exactly one clock reset (step 708). For each marked interval, the process identifies the best clock reset (step 710). The best clock reset may be identified by the linear search algorithm for one clock reset, as discussed above, or alternatively by a linear search for one clock reset with slope given by some average of the slopes in the unmarked intervals. Then, the process merges the clock resets in all the marked intervals (step 712), calculates the best skew line for the identified clock resets (step 714), and ends.

Another approach to identify the clock resets is to consider the two one-way-delay data between the two machines. The supporting straight lines for the two one-way-delay points have symmetric slopes. When there is a clock reset, the delay points would shift up for one data direction and shift down for the other data direction. By considering this observation and applying Convex_Hull_L, one can design a marching algorithm to identify the clock resets. This algorithm, as well as the divide-and-conquer algorithm can be applied to address the clock skew problem with NTP. After identifying all the clock resets, one can then apply Identify_Best_Alpha to find the global optimal solution for the skew lines with the clock resets given by the above heuristics. One may observe that the above algorithms can be applied for the counting objective, $obj_3$, if a simple counter is used to record the number of points on the skew line as its slope increases. The complexity of the algorithm stays the same.

Clock Skew Corrections with Velocity Adjustments

The Network Time Protocol (NTP) is used to synchronize the time of a computer to another server or reference time source, such as a radio or satellite receiver. Each computer can communicate with multiple peers and reference time sources. At every synchronization point, NTP determines if the clock setting needs to be adjusted, adjusts the speed of the computer clock if needed, and computes the time for the next synchronization. All the decisions and computations are with regard to previous synchronization points. Except at the first clock synchronization point, which is usually when the computer boots up, NTP only changes the speed of the clock. NTP does not reset the clock. The clock adjustment information is logged in a set of files stored on the computer.

In general, NTP can provide sub-millisecond accuracy on local area networks, and low tens of millisecond accuracy on wide area networks. The delay measurements between two computers depends on the clocks on both machines. These machines may be both running NTP. The status of the remote clock is usually unknown, which results in inaccurate measurements. In accordance with a preferred embodiment of the present invention, the accuracy of such measurements is improved in several ways. If the remote machine is not running NTP, one may first adjust the measurements according to clock corrections from the local NTP (or cron) log files. One may then apply the clock reset algorithms to obtain the clock skew for the remote machine, and adjust the measurements. Since the local NTP (or cron) log files are updated online, this whole approach can be applied online as well. In the event that the remote machine is running NTP, and the log files are not readily available from either machine, the combined effects of the velocity adjustments from both machines may be estimated.

Figure 8A:
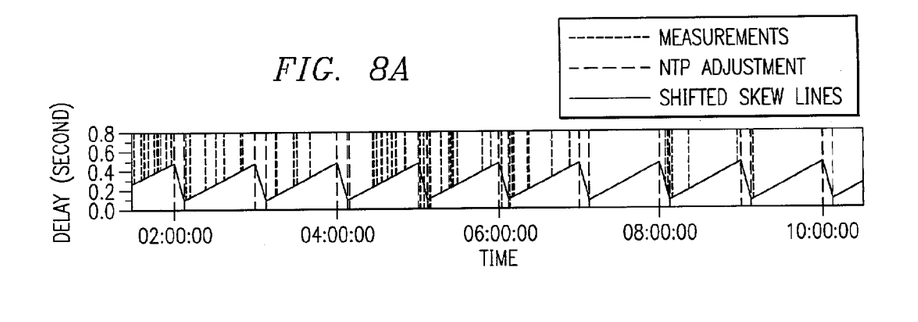
FIGS. 8A–8C are example plots that illustrate measurement samples for machines connected by a network with clock speed adjustments in accordance with a preferred embodiment of the present invention.
Figure 8B:
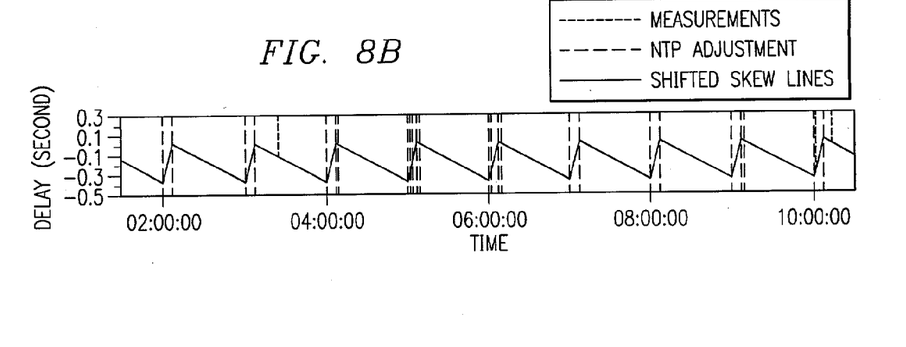
Figure 8C:
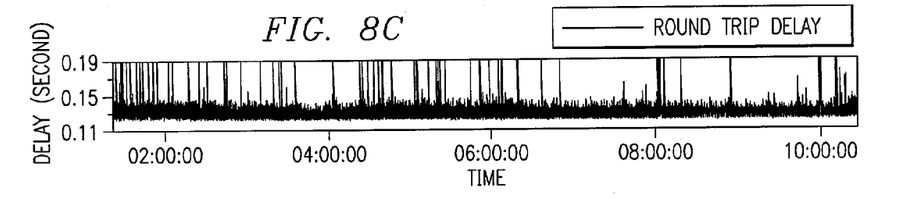
Figure 9A:
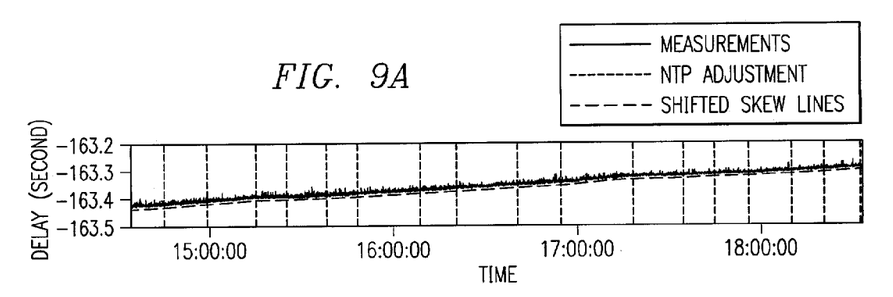
FIGS. 9A–9C illustrate example measurement samples in which one machine uses Network Time Protocol to adjust its clock and the other machine does not adjust its clock.
Figure 9B:
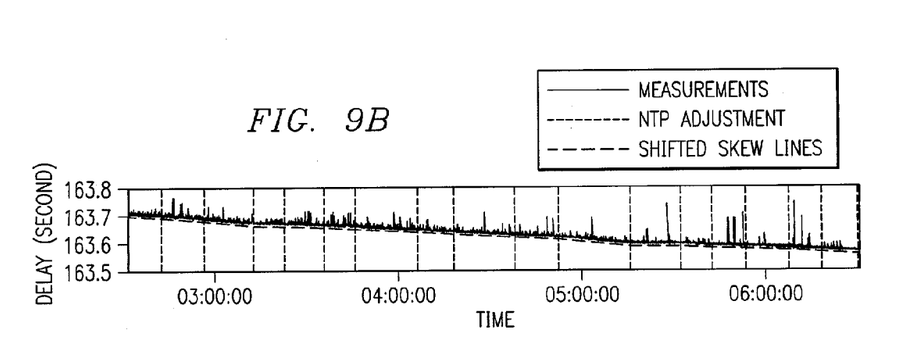
Figure 9C:
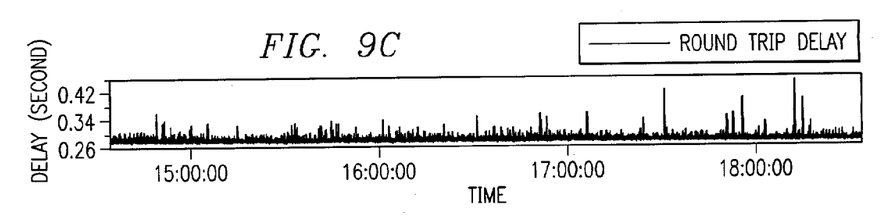

Turning now to FIGS. 8A–8C, example plots illustrate measurement samples for machines connected by a network with clock speed adjustments in accordance with a preferred embodiment of the present invention. FIGS. 8A and 8B show the two one-way delay measurements. FIG. 8C illustrates the round trip delay measurements. From the measurement data, one would observe a supporting straight line underneath the delay points, and then at a certain point the supporting line would change its slope. These are the piecewise linear skew lines for measurements with NTP versus the parallel linear skew lines shown in FIGS. 5A and 5B. FIGS. 9A–9C illustrate example measurement samples in which one machine uses NTP to adjust its clock and the other machine does not adjust its clock. FIGS. 9A and 9B show the two one-way delay measurements and FIG. 9C shows the round trip delay.

As before, a finite collection of measurement points, $\Omega = \{v_i = (t_i, d_i): i=1, \ldots, N\}$, is assumed. It is also assumed that the R clock reset times $\{x_1, x_2, \ldots, x_R\}$ are given. Assume $t_{k_i-1} < x_i \leq t_{k_i}$, $i=1, \ldots, R$, where $1 < k_1 < k_2 < \ldots < k_R < N-1$. These reset times divide all the points into R+1 sections, $\Omega_1, \ldots, \Omega_{R+1}$. In accordance with a preferred embodiment of the present invention, the best piecewise linear supporting lines are found in the R+1 segments such that they change their slopes at the given reset times and that they are close to $\Omega_j$, $j=1, \ldots, R+1$.

Similar to the instantaneous time adjustment problem, this problem can be formulated as a linear program. Let $\{(t_1, b_0), (x_1, b_1), \ldots, (x_R, b_R), (t_N, b_N)\}$ be the turning points for the piecewise linear supporting lines. Here $b_0, b_1, \ldots, b_R, b_N$ are the variables that need to be solved. For convenience, let $k_0=1$, $k_{R+1}=N$, $x_0=t_1$, $x_{R+1}=t_N$. It is required that all the measurement points be above the line segments. This leads to the following set of linear constraints:

For all $i=k_j, \ldots, k_{j+1}-1$, $j=0, \ldots, R$:

$$d_i - b_j \geq \frac{b_{j+1} - b_j}{x_{j+1} - x_j}(t_i - x_j).$$

After rearranging the terms, these constraints can be written in the following form:

$$\begin{array}{ll} \bar{c}_{01}b_0 + \bar{c}_{02}b_1 & \leq \bar{d}_0 \\ & \ddots \qquad \vdots \\ \bar{c}_{R1}b_R + \bar{c}_{R2}b_{R+1} & \leq \bar{d}_R \end{array}$$

where $\bar{c}$ and $\bar{d}$ are easily obtained from the data in $\Omega$. The distance ($obj_1$) and area ($obj_2$) objective functions may be used to measure the closeness of the measurement points and the skew lines. These two objectives are both linear functions of the variables $b_0, b_1, \ldots, b_R, b_N$. One may then apply the linear programming algorithms to find the optimal solution which minimizes $obj_1$ and $obj_2$ subject to the above constraints. The special staircase constraints above allow the decomposition techniques in linear programming to be readily applied.

For the special case that there is only one turning point, the variables $b_0, b_1, b_N$ must be solved. Both $b_0$ and $b_N$ can be expressed in terms of $b_1$. The linear objective functions are convex in $b_1$. One may then apply the instantaneous clock adjustment techniques to find a local minimum solution for $b_1$, by finding the convex hull for the points in each section and searching through $b_1$. This locally minimal solution must be globally minimal due to the convex property of the objective functions.

When there are more turning points, however, this approach does not always give the optimal solution. The key for this approach to work is that the optimal piecewise linear skew lines touch at least one measurement point within each of the R+1 sections. If this assumption holds, one can then apply the same search algorithm on $b_0$ to obtain a local optimum solution which must be globally optimal due to the convex property.

The turning points in the piecewise linear skew lines must be found. Because the skew line would have a different slope when there is a turning point in the interval, the Divide_And_Conquer algorithm can be used to identify the sub-intervals with exactly one turning point. One can then apply the linear algorithm for one turning point in the previous section to identify the best turning point.

Another approach for identifying the turning points is to examine the two one-way delay data points. One can obtain the measurements for the one-way delay from the source machine to the destination machine and, at the same time, the one-way delay from the destination machine back to the source machine. When there is a clock reset (turning point), one of the one-way delay measurements would turn up and the other one-way delay measurement would turn down. This is best illustrated in FIGS. 8A and 8B for "ntpdate." This phenomenon would make the skew line for the upturning plot unchanged and the skew line for the down turning plot rotate down. The skew lines for these two one-way measurements should have symmetric slopes, i.e., the sum of the slopes should be close to zero. This marching algorithm would march over time and consider the measurement points from the two one-way delay points, one point at a time. The algorithm would update the convex hull and the best skew line for each set of the one-way delay points. When the sum of the slopes is small enough and incorporating the new point makes the sum farther away from origin, one would consider this new point a turning point.

Marching Algorithm:
(1) Initialization:
    Adjust the initial time offsets;
    take one point from each one-way delay measurement;
(2) March over time. Select the next point until the end;
    update best skew lines for each one-way delay;
(3) Check condition for turning points
    If the sum of the slopes is small enough and the new point changes this sum away from origin, then
        +this new point is a turning point;
        +print out the previous section;
        +start a new section;
(4) Goto Step (2) until end.

This algorithm identifies the number of clock resets, instead of being supplied with the number of clock resets ahead of time. The algorithm agrees with the intuition from visual observations for turning points by comparing two one-way delay measurements. Combining the two one-way delay measurements takes into account more information, and hence has potential to be more accurate. One also obtains the best skew lines in each section from this algorithm. In order for this algorithm to provide the correct answer, one needs to have fairly stable measurement data. The most attractive feature of this algorithm is that it is adaptive, and can be readily applied online due to its nature of marching over time.

One drawback of this algorithm is that it is quite sensitive to network congestion. It may produce false turning points. And the error during each step of the algorithm can propagate in later steps. One way to reduce the number of false turning points is by weakening the conditions for detecting the turning points. This approach, however, would lead to the late detection of the turning points, which causes larger errors to propagate into future estimates. One can resolve this issue by keeping a short history list of the last certain number of points. When the algorithm detects a turning point, it would use the best candidate in the history list as the true turning point to calculate the skew lines. The algorithm then would march on from this true turning point.

Figure 10:
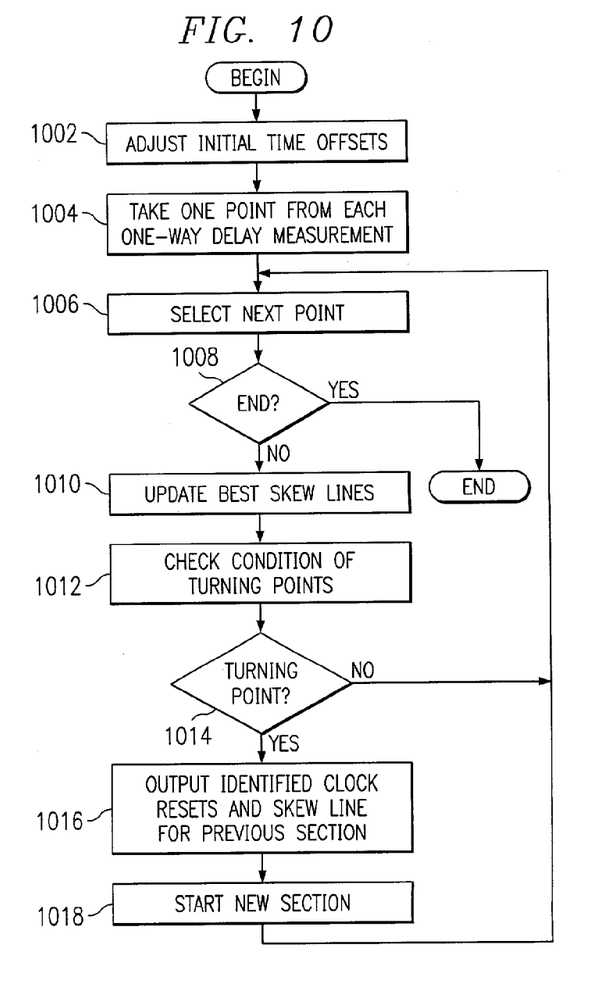
FIG. 10 is a flowchart illustrating the operation of a process for identifying turning points due to clock speed adjustments in accordance with a preferred embodiment of the present invention.

Turning now to FIG. 10, a flowchart illustrating the operation of a process for identifying turning points due to clock speed adjustments is shown in accordance with a preferred embodiment of the present invention. The process begins, adjusts the initial time offsets (step 1002), and takes one point from each one-way delay measurement (step 1004). Next, the process selects the next point (step 1006) and a determination is made as to whether the end of the measurement is reached (step 1008). If the end is reached, the process ends.

If the end is not reached in step 1008, the process updates the best skew lines (step 1010) and checks the condition of turning points (step 1012). If the sum of the slopes is small enough and the new point changes this sum away from origin, then this new point is a turning point. If the point is not a turning point, the process returns to step 1006 to select the next point. If, however, the point is a turning point in step 1014, the process outputs the identified clock resets and skew line for the previous section (step 1016), starts a new section (step 1018), and returns to step 1006 to select the next point.

Online Estimation and Correction

Many real time applications require the skew of the delay measurements to be corrected online. Being able to correct the clock skews online provides better flexibility and adaptivity for the applications. Correcting the clock skews online can also be used as a means for active clock synchronization. It can be an alternative to or be used in combination with other clock synchronization algorithms such as NTP.

Algorithm Convex_Hull_L scans through each measurement point in increasing order and builds a stack to store the lower convex hull of the previous points. It can obviously be applied online, as measurement points accumulate. Therefore, for the case with no clock resets, the algorithm can be applied in an online manner, with the same complexity.

Considering the case with possible clock resets and assuming there is at most one clock reset every p units of time, which is generally the case in real systems, one may apply the algorithm R-Resets for an initial set of measurement data, up to time $\tau$. The optimal clock reset times produced by the algorithm prior to time $\tau-p$ are fixed. The last fixed clock reset time is labeled to be $t_{last\_fixed\_reset}$. As more measurement points become available, until time $t_{last\_fixed\_reset}+2p$, the algorithm is performed allowing only one clock reset after $t_{last\_fixed\_reset}$. At the first measurement point after time $t_{last\_}$fixed_reset+2p, the algorithm is performed allowing two clock resets after $t_{last\_fixed\_reset}$. The first of the two clock resets are then fixed and $t_{last\_fixed\_reset}$ is updated. This procedure is repeated until some time in the future when part of the history data is discarded and the variables are updated to make the results more representative of the recent data.

For the case with NTP, as discussed with respect to instantaneous clock adjustments, the marching algorithm is already an online algorithm, which is an attractive feature.

An advantage of applying the algorithms online is that the current best clock skew estimate can be obtained. Using the remote clock as a reference source, one can adjust the local clock according to the skew estimate at certain well defined synchronization points. These synchronization points can be defined according to the previous data, for example, when the skew correction reaches a certain threshold.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although the depicted illustrations show the mechanism of the present invention embodied on a single server, this mechanism may be distributed through multiple data processing systems. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for correcting delay measurement data with clock resets, comprising:
    examining possible clock reset combinations;
    for each possible clock reset combination, dividing the delay measurement data into a predetermined number of segments, calculating a convex hull, and calculating a skew slope;
    identifying a best skew slope for all possible clock reset combinations;
    calculating clock reset times associated with the best skew slope; and
    removing the effect of calculated clock resets from the delay measurement data.

2. The method of claim 1, wherein the step of calculating a skew slope comprises identifying a line that is closest to the delay measurement data.

3. The method of claim 2, wherein the step of identifying a line that is closest to points in the delay measurement data comprises identifying a line that satisfies an objective function.

4. The method of claim 3, wherein the objective function minimizes a sum of vertical distances between the line and the points.

5. A computer program product, in a recordable-type computer readable medium, for correcting delay measurement data with clock resets, comprising:
    instructions for examining possible clock reset combinations;
    instructions for dividing the delay measurement data into a predetermined number of segments, calculating a convex hull, and calculating a skew slope, for each possible clock reset combination;
    instructions for identifying a best skew slope for all possible clock reset combinations;
    instructions for calculating clock reset times associated with the best skew slope; and
    instructions for removing the effect of calculated clock resets from the delay measurement data.

6. The computer program product of claim 5, wherein the instructions for calculating a skew slope comprise instructions for identifying a line that is closest to the delay measurement data.

7. The computer program product of claim 6, wherein the instructions for identifying a line that is closest to points in the delay measurement data comprises instructions for identifying a line that satisfies an objective function.

8. The computer program product of claim 7, wherein the objective function minimizes a sum of vertical distances between the line and the points.

9. An apparatus for correcting delay measurement data with clock resets, comprising:
    a processor; and
    a memory electrically connected to said processor, the memory having stored therein a program to be executed on said processor for performing the following steps:
        examining possible clock reset combinations;
        for each possible clock reset combination, dividing the delay measurement data into a predetermined number of segments, calculating a convex hull, and calculating a skew slope;
        identifying a best skew slope for all possible clock reset combinations;
        calculating clock reset times associated with the best skew slope; and
        removing the effect of calculated clock resets from the delay measurement data.

* * * * *